United States Patent [19]
Murray

[11] Patent Number: 5,944,781
[45] Date of Patent: Aug. 31, 1999

[54] PERSISTENT EXECUTABLE OBJECT SYSTEM AND METHOD

[75] Inventor: Freeman Cameron Murray, San Jose, Calif.

[73] Assignee: Sun Microsystems, Inc., Palo Alto, Calif.

[21] Appl. No.: 08/652,719

[22] Filed: May 30, 1996

[51] Int. Cl.$^6$ .............................. G06F 13/37; G06F 15/17
[52] U.S. Cl. .............. 709/202; 395/200.48; 395/200.59; 707/10
[58] Field of Search .................. 395/200.53, 200.55, 395/200.56, 200.32, 200.59, 200.31, 200.33, 200.48; 707/104, 10

[56] References Cited

U.S. PATENT DOCUMENTS

| | | | |
|---|---|---|---|
| 5,175,851 | 12/1992 | Johnson et al. | 707/8 |
| 5,493,728 | 2/1996 | Solton et al. | 364/DIG. 1 |
| 5,544,320 | 8/1996 | Konrad | 395/200.33 |
| 5,655,081 | 8/1997 | Bonnell et al. | 395/200.32 |
| 5,687,373 | 11/1997 | Holmes et al. | 395/682 |

OTHER PUBLICATIONS

Document on Netscape's, David M. Kristol, Bell Labs, Apr. 25, 1996.

Glenn Krasner, "The Smalltalk–80 Virtual Machine" BYTE Publications Inc., Aug. 1991, pp. 300–320.

Ronald L. Johnston, "The Dynamic Incremental Compiler of APL/3000," Proceedings of the API '79 Conference, published as APL Quote Quad, 9(4), pp. 82–87.

Leo J. Guibas et al., "Compilation and Delayed Evaluation in APL," Fifth Annual Symposium on Principles in Programming Languages, pp. 1–8, 1978.

Kin–Man Chung et al., "A 'Tiny' Pascal Compiler: Part 1:: The P–Code Interpreter," *BYTE Publications*, Inc., Sep. 1978, pp. 58, 60, 62–65, 148–155.

Kin–Man Chung et al., "A 'Tiny' Pascal Compiler: Part 2: The P–Compiler," *BYTE Publications*, Inc., Oct. 1978, pp. 34, 36, 38, 40, 42, 44, 46, 48, 50, 52.

Gene McDaniel, An Analysis of a Mesa Instruction Set, a Xerox Corporation document, May 1982, pp. 1–17.

James G. Mitchell et al., "Mesa Language Manual," a Xerox Corporation document, pp. 1–150.

Kenneth A. Pier, "A Retrospective on the Dorado, A High––Performance Personal Computer," Conference Proceedings, The 10th Annual International Symposium on Computer Architecture , Aug. 1983, pp. 252–269.

Kenneth A. Pier, "A Retrospective on the Dorado, A High Peformance Personal Computer," a Xerox Corporation Document , Aug. 1983, pp. 1–40.

Ken Thompson, "Programming Techniques: Regular Expression Search Algorithm," *Communications of the ACM*, vol. 11, No. 6, Jun. 1968, Edited by R. M. McClure, pp. 419–422.

*Primary Examiner*—Mark H. Rinehart
*Attorney, Agent, or Firm*—Townsend and Townsend and Crew LLP

[57] ABSTRACT

Method and apparatus for making applets persistent are provided. A persistent applet operating on a client system may be saved along with its complete state to a remote server. When desired, the client system may retrieve the persistent applet with its previous state.

37 Claims, 3 Drawing Sheets

PERSISTENT EXECUTABLE OBJECT SYSTEM AND METHOD

STATEMENT OF RELATED APPLICATIONS

This application is related to the subject matter of two other applications, METHOD AND SYSTEM FOR FACILITATING SERVLETS, Ser. No. 08/657,712, filed May 30, 1996, and METHOD AND APPARATUS FOR SECURING EXECUTION OF AN OBJECT IN A NETWORKED ENVIRONMENT, Ser. No. 08/656,815, filed May 30, 1996. These applications are commonly assigned with the present application, have the same filing date as the present application, and are expressly incorporated by reference herein.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

TRADEMARK NOTICE

Sun, Sun Microsystems, the Sun Logo, Java, and Java Object Serialization are trademarks or registered trademarks of Sun Microsystems, Inc in the United States and other countries.

BACKGROUND OF THE INVENTION

The present invention relates to the field of computer systems and their operation. More specifically, in one embodiment the invention provides a system and method for providing persistence to an applet constrained from saving information on a local system.

The availability of Java applets on Internet and intranet servers in combination with the proliferation of Java-capable client software has transformed the paradigm of network computing. According to this new paradigm, a client system may perform a function without having locally stored code in its native language. Instead, the client system requests from a server an applet compiled from Java source code. The applet is transferred from the server to the client and then runs on the client. In a typical scenario, an HTTP/HTML web browser operating operates according to this protocol. The request for the applet is part of an HTTP request for a web page. The applet itself is forwarded embedded within the requested web page. The browser includes software for translating the compiled Java code into the client system's native language, either by interpretation or just-in-time compilation.

The advantages of this approach are numerous. So-called "network computers" may operate with minimal local software storage by simply downloading applications when necessary. Furthermore, applications may be compiled into a single language and operate on client systems having disparate architectures.

Java is described in Tyma et al., Java Primer Plus, 1996, incorporated herein by reference for all purposes.

Security concerns are paramount in the design of protocols for the operation of applets over a network. To protect the integrity of the client system, the applet may not freely write to local memory and physical storage. The server itself is equipped with a so-called firewall which permits network access to its files only through the HTTP protocol.

The security mandated inability of applets to save locally restricts their range of application because a user cannot easily return to previous work product. In general, a particular invocation of an applet will have no memory of previous invocations of the same applet. However, many computer-aided tasks such as word processing, drawing, etc. require storage of intermediate work product to be of any value to a user.

One possible solution to this problem of applet persistence is to permit applets to store data locally or even store themselves locally. This solution however raises serious security problems since carelessly designed applets or intentionally designed "Trojan horse" applets will then have the ability to damage the client system. What is needed is a secure system for providing persistence to applets.

SUMMARY OF THE INVENTION

Method and apparatus for making applets persistent are provided by virtue of the present invention. According to one embodiment of the present invention, a persistent applet operating on a client system may be saved along with its complete state to a remote server. When desired, the client system may retrieve the persistent applet with its previous state.

On the client side, the persistence capability may be provided by enhancements to an applet viewer rather than the applets themselves. On the server side, the persistence capability may be provided by a so-called servlet, a module of executable code downloaded when needed from an independent server to the server interacting with the client. The operation of servlets is described in U.S. Application No. entitled METHOD AND SYSTEM FOR FACILITATING SERVLETS filed on the same day as this application and assigned to the same assignee.

Leaving persistence code out of the applets provides advantages not even realized by stand-alone applications which do not provide the security and universality of applets. For example, now applet developers need not concern themselves with saving and retrieval routines since these capabilities are provided by the persistence enhancements to the client and server.

Furthermore, since the applets themselves do not grow in size to be persistent, transmission bandwidth is conserved at the time the applet is downloaded to the client. This is particularly important when leased lines are used and transmission cost increases with volume of transmitted data.

In one embodiment, to facilitate storage and retrieval of applets and/or their states across the network, the information to be saved is transmitted within HTTP messages. Since, HTTP messages are transmittable around server firewalls, data may be stored and retrieved between the client and server in this way without compromise to server security. The client sends an HTTP POST message, the message typically used in the prior art for transmission of user form entries from the client to a server. The POST message begins with a URL that initiates an HTTP connection. The URL includes the address of the server, information identifying a remote database, the name of an object, and a particular storage or retrieval command for that object. If an object is to be transferred to the server, it follows the URL in the form of a serial data stream. If the object is to be transferred from the server to the client, the server responds to the POST message by transferring the object in the form of a serial data stream.

This storage and retrieval protocol may take advantage of a system for converting Java objects into a serial data stream and vice versa. A preferred system for serializing such information is known as Java Object Serialization, the specification of which is described below and attached as Appendix.

A further understanding of the nature and advantages of the inventions herein may be realized by reference to the remaining portions of the specification and the attached drawings.

DESCRIPTION OF SPECIFIC EMBODIMENTS

Figure 1A:
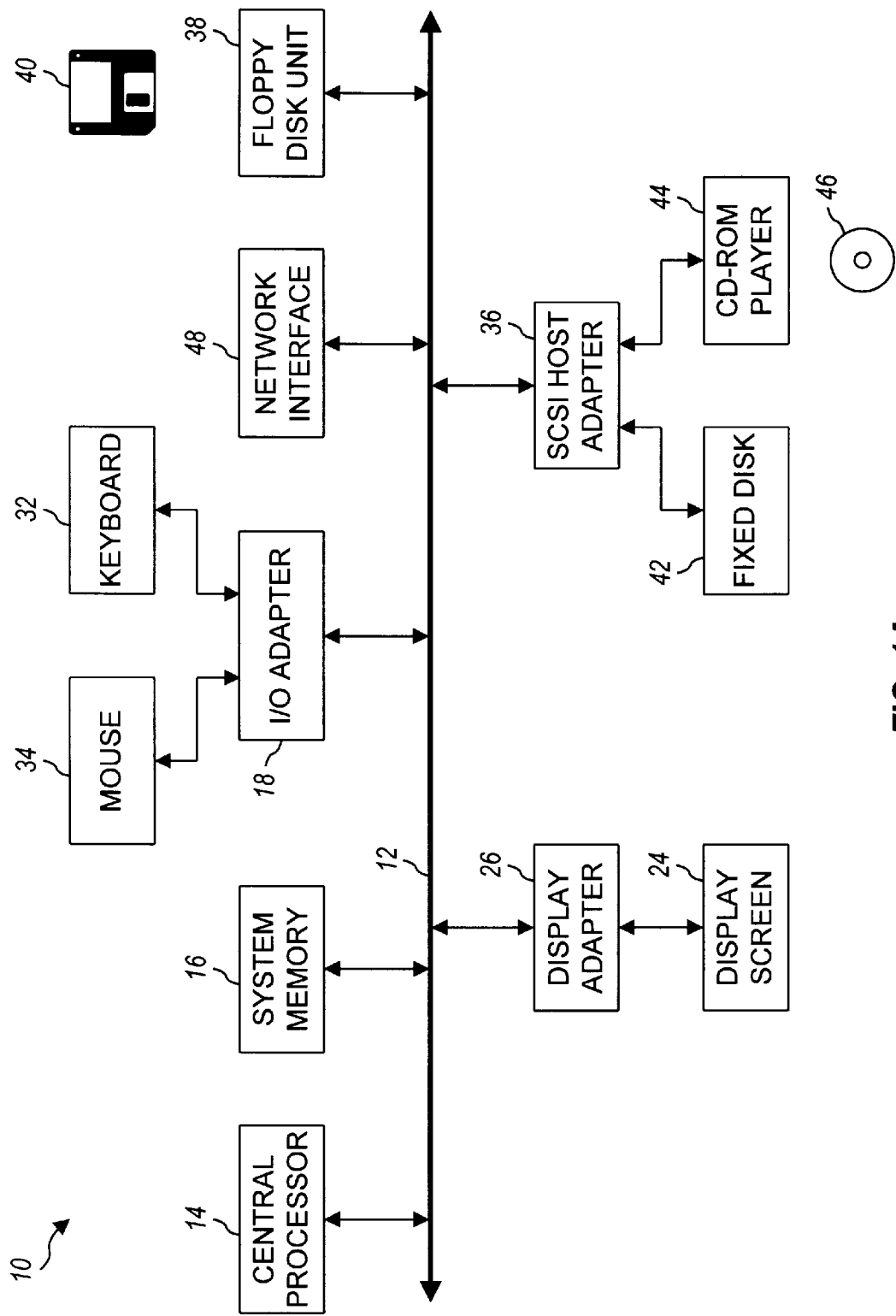
FIG. 1A is an illustration of a computer system on which the present invention may operate.

FIG. 1A depicts a block diagram of a host computer system 10 suitable for implementing the present invention. Host computer system 10 includes a bus 12 which interconnects major subsystems such as a central processor 14, a system memory 16 (typically RAM), an input/output (I/O) adapter 18, an external device such as a display screen 24 via display adapter 26, a keyboard 32 and mouse 34 via I/O adapter 18, a SCSI host adapter 36, and a floppy disk drive 38 operative to receive a floppy disk 40. SCSI host adapter 36 may act as a storage interface to a fixed disk drive 42 or a CD-ROM player 44 operative to receive a CD-ROM 46. Fixed disk 44 may be a part of host computer system 10 or may be separate and accessed through other interface systems. A network interface 48 may provide a direct connection to a remote server via a telephone link or to the Internet via a POP (point of presence). Many other devices or subsystems (not shown) may be connected in a similar manner.

Also, it is not necessary for all of the devices shown in FIG. 1A to be present to practice the present invention, as discussed below. The devices and subsystems may be interconnected in different ways from that shown in FIG. 1A. The operation of a computer system such as that shown in FIG. 1A is readily known in the art and is not discussed in detail in this application. Code to implement the present invention, including operating system code, code to implement a windowed user interface, and/or application code may be operably disposed or stored in computer-readable storage media such as system memory 16, fixed disk 42, CD-ROM 46, or floppy disk 40.

Figure 1B:
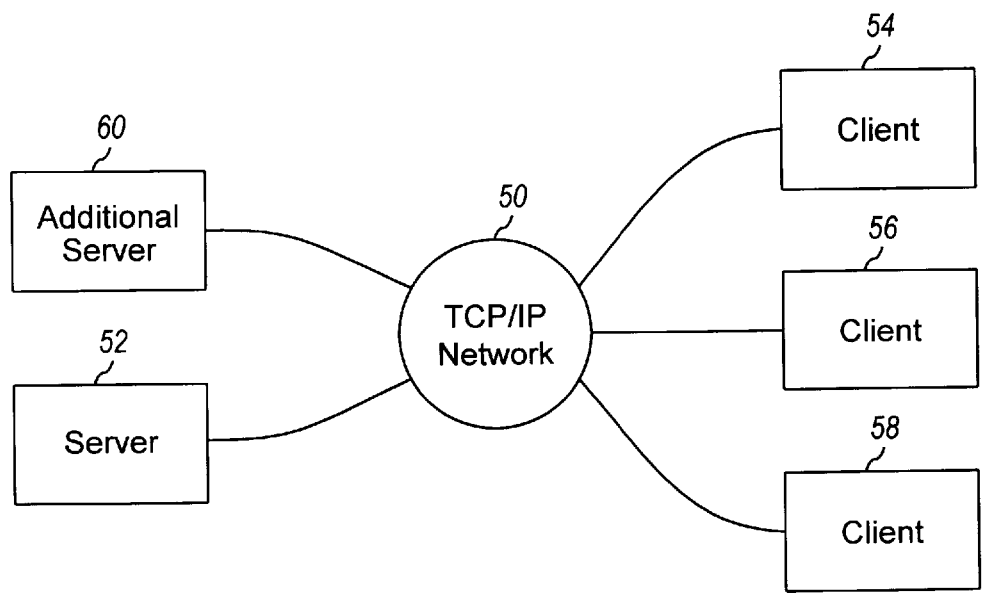
FIG. 1B is an illustration of a network on which the present invention may operate.

FIG. 1B depicts the interconnection of a server and remote clients. FIG. 1B depicts a TCP/IP network 50 interconnecting a server 52, an additional server 60 and remote clients 54, 56, and 58. One or more of servers 52 and 60, and remote clients 54, 56, and 58 may be implemented using a system such as host computer system 10. Network interface 48 provides the connection from these computer systems to TCP/IP network 50. Protocols for exchanging data via TCP/IP network 50 are well known and need not be discussed herein. TCP/IP network 50 could be the Internet or a private intranet. The present invention is not however restricted to TCP/IP networks.

The following description will assume the availability of certain network protocols at servers 52 and 60 and remote clients 54, 56, and 58. At a low level, it will be assumed that these entities are conversant in TCP/IP. At a higher level, it will be assumed that servers 52 and 60 are equipped to operate as HTTP servers and that remote clients 54, 56, and 58 are equipped to operates as HTTP clients. HTTP (Hypertext Transfer Protocol) is described in Berners-Lee, et al., "Hypertext Transfer Protocol—HTTP/1.0", *Internet Request for Comments*, no. 1945, May 1996, the contents of which are herein incorporated by reference. Those of skill in the art will appreciate that HTTP operates at a level above TCP/IP and takes advantage of the ability to exchange information via the TCP/IP protocols.

Furthermore, server 52 stores various applets compiled in the Java language and available for downloading to clients 54, 56, and 58 in response to HTTP requests from the clients. Clients 54, 56, and 58 operate so-called applet viewers capable of translating the applets into code suitable for local execution and then executing the code. This translation may be either by way of interpretation or just-in-time compilation. An applet viewer may be a web browser or an independent application. In the context of web browser operation, a downloaded applet may be part of a web page.

Server 52 may also run so-called "servlets" originating with server 60. A servlet is a module of executable code downloaded when needed from an independent server to the server interacting with the client. The operation of servlets is described in U.S. Application No. entitled METHOD AND SYSTEM FOR FACILITATING SERVLETS filed on the same day as this application and assigned to the same assignee.

The applet viewers constrain the applets in various ways for security reasons. One way that the applet is constrained is that it cannot store itself or its data on fixed disk 42. The present invention provides a way of circumventing this restriction to make an applet persistent allowing a new invocation of an applet to retrieve the state of a previous invocation.

The persistence capability is provided by adding an object storage capability at the server and a protocol for saving and retrieving objects at the server under the direction of the client. The applet viewer is modified at the client to operate in accordance with this saving and retrieving protocol. The modified applet viewer transmits and receives objects by embedding them in serial form within HTTP messages.

Figure 2:
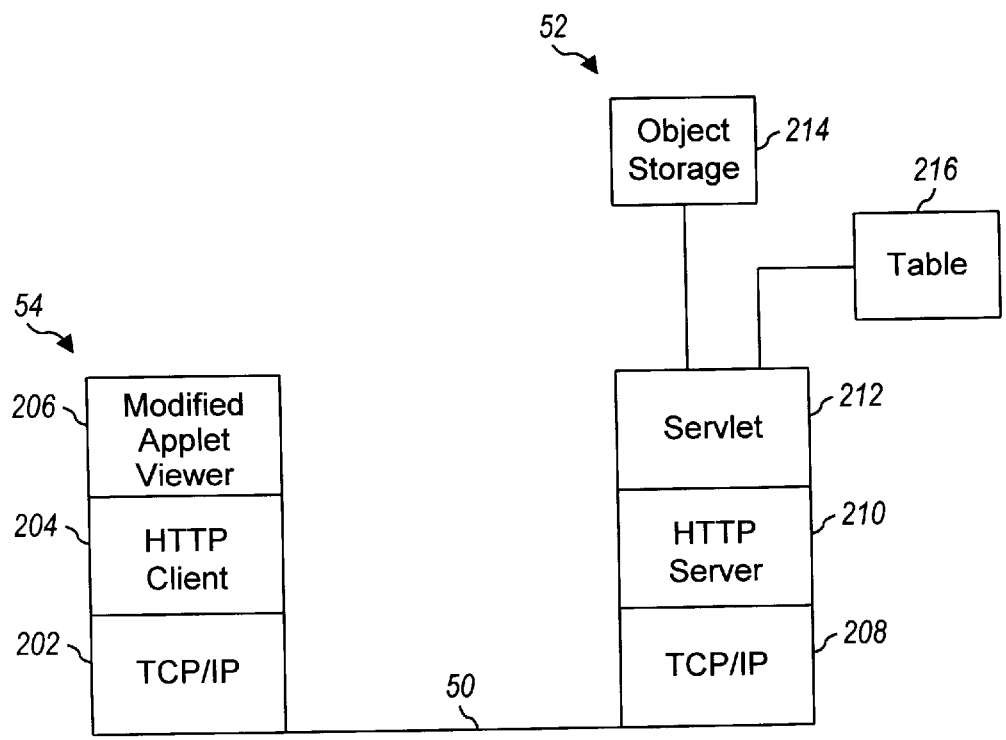
FIG. 2 depicts software components operating at a server and a remote client in one embodiment of the present invention.

FIG. 2 depicts software components operating at server 52 and remote client 54 in one embodiment of the present invention. Remote client 54 incorporates a TCP/IP protocol entity 202 for communicating over TCP/IP network 50. Above TCP/IP protocol entity 202 is an HTTP client protocol entity 204. A Java applet viewer 206 modified in accordance with the present invention operates above HTTP protocol entity 204. At server 52, a matching TCP/IP entity 208 communicates with TCP/IP protocol entity 202 via TCP/IP network 50. An HTTP server protocol entity 210 exchanges information with HTTP client protocol entity 204.

A servlet 212 operates to save and retrieve objects under the control of modified applet viewer 206. Servlet 212 interacts with an object storage database 214. A hash table 216 operates as an index to object storage database 214 listing object names and pointers to database 214.

Figure 3:
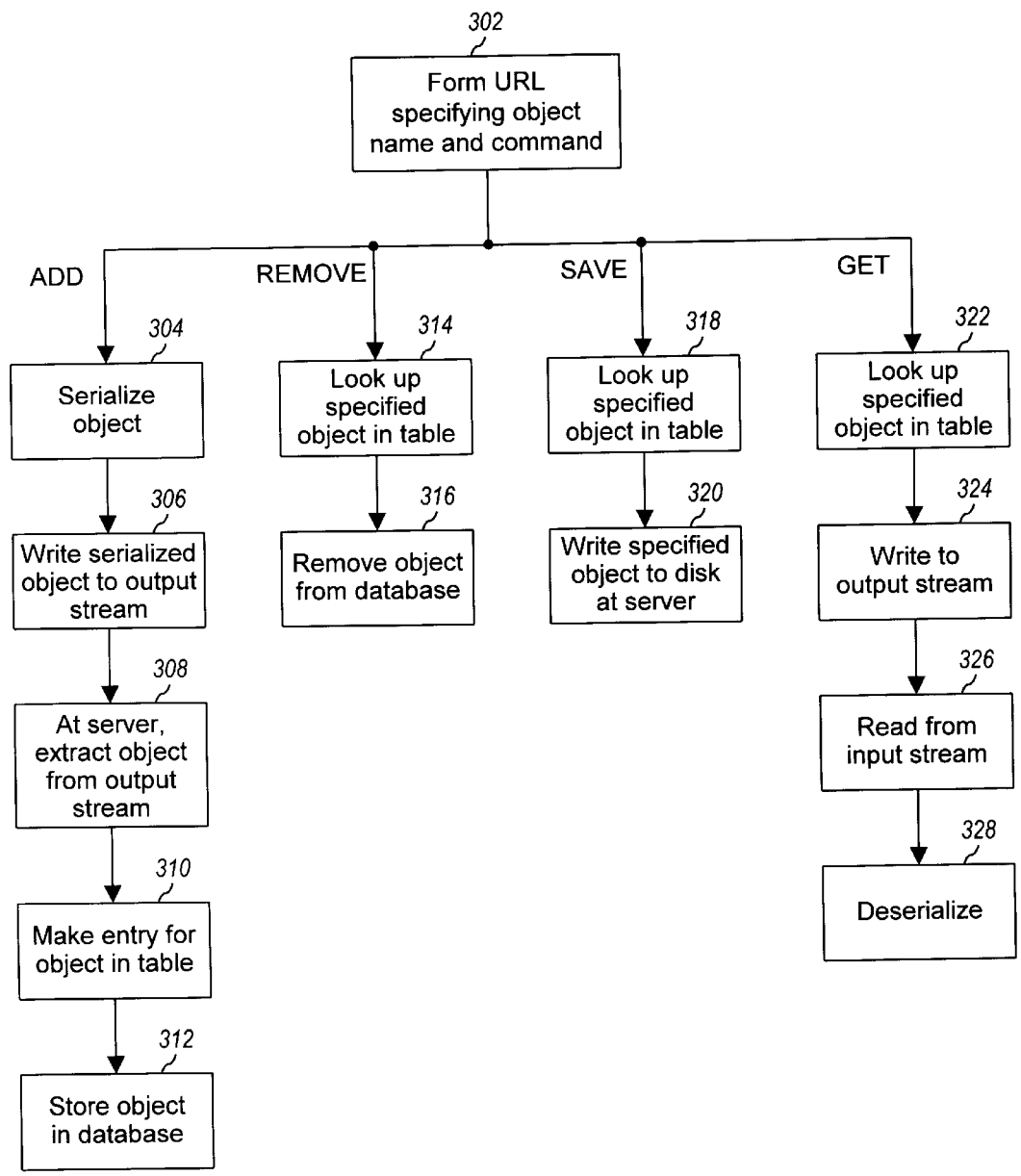
FIG. 3 is an overall flow diagram illustrating storage/retrieval operations in one embodiment of the present invention.

FIG. 3 is an overall flow diagram illustrating storage/retrieval operations in one embodiment of the present invention. At step 302, modified applet viewer 206 forms a URL in the form http://host/servlet name?method. "Host" identifies server 52. "Servlet name" identifies database 214.

"Method" identifies a particular storage or retrieval operation to invoke on server 52. In a preferred embodiment the available operations are add, remove, save and get. "Add" will save an object to database 214. "Remove" deletes an object from database 214. "Save" instructs servlet 212 to save an object from database 214 to disk. "Get" retrieves an object from database 214. The URL formed in step 302 becomes the first part of an HTTP POST message sent by HTTP client protocol entity 204 to establish a connection to HTTP server protocol entity 210.

Further processing will depend on the particular operation specified in step 302. For "add," at step 304, modified applet viewer 206 invokes an object serialization technique to convert the object to be saved to a stream of bytes. Object serialization enables an object to be written to a storage medium in a serial byte-at-a-time manner. A preferred system for serializing Java objects is known as Java Object Serialization and is provided by Sun Microsystems, Inc. at http://chatsubo.javasoft.com/current/serial/ on May 30, 1996. The information available at this site is incorporated herein by reference for all purposes. Furthermore, the specification for Java Object Serialization is described below in more detail and attached as Appendix. At step 306, this serialized data stream is written to an output stream of the HTTP POST message. At step 308, at server 52, servlet 212 extracts this stream from the HTTP POST message. At step 310, servlet 212 makes an entry for the serialized object in table 216. Table 216 is created at this point if it hasn't already been created. At step 312, servlet 212 stores the serialized object in database 214 noting its location in table 316.

For "remove", at step 314, servlet 212 looks for the name of the object to be removed in table 216 and thus identifies its location in database 214. Servlet 212 then removes the object from database 214 at step 316.

For "save," at step 318, servlet 212 looks for the name of the object to be saved to disk in table 216 and thus identifies its location in database 214. Servlet 212 then saves the specified object to disk at step 320.

For "get," at step 322, servlet 212 looks for the name of the object to be retrieved in table 216. At step 324, servlet 212 retrieves the object from database 214 and writes it to an output data stream to be returned to client 54. At step 326, modified applet viewer 206 reads from this output data stream as received through HTTP client protocol entity 204. At step 328, modified applet viewer 206 again invokes RMI to deserialize the data stream and convert into an object.

In a preferred embodiment, the term "object" refers to a Java applet and its current state. Thus, by storing and retrieving objects as shown in FIG. 3, a Java applet is made to be persistent. However, any data item may be saved remotely in accordance with the present invention.

The above description is illustrative and not restrictive. Many variations of the invention will become apparent to those of skill in the art upon review of this disclosure. Merely by way of example a specific computer configuration and set of processing steps has been utilized for illustration, but the order and particular process steps could be varied, and the invention is operable on a wide range of computer platforms. The scope of the invention should, therefore, be determined not with reference to the above description, but instead should be determined with reference to the appended claims along with their full scope of equivalents.

Serialization/Deserialization of Objects

The capability to store and retrieve Java objects is essential to building all but the most transient applications. The key to storing and retrieving objects is representing the state of objects in a serialized form sufficient to reconstruct the object(s). For Java objects, the serialized form must be able to identify and verify the Java classes from which the fields were saved and to restore those fields to instances of the same classes. The serialized form does not need to include the complete class definition but requires that the class is available when needed.

Objects to be stored and retrieved frequently refer to other objects. Those other objects must be stored and retrieved at the same time to maintain the relationships between the objects. When an object is stored all of the objects that are reachable from that object are stored as well.

The goals for serializing Java objects are to: have a simple yet extensible mechanism; maintain the Java object type and safety properties in the serialized form; be extensible to support marshaling and unmarshaling as needed for remote objects; be extensible to support persistence of Java objects; and require per class implementation only for customization. The following discussion describes one embodiment for serializing and deserializing Java objects. It should be apparent to those skilled in the art that alternate methods of serializing and deserializing objects may also be employed within the scope of the present invention.

Writing Objects to a Stream

The following code example, which serializes today's date to a file, shows how objects and primitives are written to a stream:

FileOutputStream f=new FileOutputStream("tmp");

Objectoutput s=new ObjectOutputStream(f);

s.writeObject ("Today");

s.writeObject (new Date( ));

s. flush ( );

First an "outputStream," in this case a "FileOutputStream," is needed to receive the bytes. Then an "ObjectOutputstream" is created that writes to the "OutputStream." Next, the string "Today" and a "Date" object are written to the stream. More generally, objects are written with the "writeobject" method and primitives are written to the stream with the methods of "DataOutputStream."

The "writeobject" method serializes the specified object and traverses its references to other objects in the object graph recursively to create a complete serialized representation of the graph. Within a stream, the first reference to any object results in the object being serialized and the assignment of a handle to that object. Subsequent references to that object are encoded as the handle. Using object handles preserves sharing and circular references that occur naturally in object graphs. Subsequent references to an object use only the handle allowing a very compact representation.

The serialized encoding of an object consists of the object's class followed by the fields of each class starting with the highest superclass and ending with the actual class. For an object to handle its own serialization it must implement the "writeobject" method. To maintain the integrity of the class, this method is private to the class and can only be called by the serialization at runtime. This method is invoked when the fields of its class are to be written; it should write the information needed to reinitialize the object when it is deserialized. The default mechanism writes each non-static and non-transient field to the stream. Each field is written appropriately depending on its type. The fields are put in a canonical order so as to be insensitive to the order of declaration.

Objects of class "Class" are serialized as the name of the class and the fingerprint or hash of the interfaces, methods, and fields of the class. The name allows the class to be identified during deserialization and the hash of the class allows it to be verified against the class of the serialized object. All other normal Java classes are serialized by writing the encoding of its Class followed by its fields.

"ObjectOutput" streams can be extended to customize the information in the stream about classes or to replace objects to be serialized. Refer to the "annotateclass" and "replaceObject" method descriptions listed in the Appendix for details.

Reading Objects from a Stream

The following code example shows a method for reading an object from a stream.
// Deserialize a string and date from a file.
FileInputstream in=new FileInputStream("tmp");
ObjectInputStream s=new ObjectInputStream(in);
String today=(String)s.readObject( );
Date date=(Date)s.readObject( );

First an "Inputstream," in this case a "FileInputStream," is needed as the source stream. Then an "ObjectInputStream" is created that reads from the "Inputstream." Next, the string "Today" and a Date object are read from the stream. More generally, objects are read with the "readobject" method and primitives are read from the stream with the methods of "DataInputStream."

The "readObject" method deserializes the specified object and traverses its references to other objects recursively to create the complete graph of objects serialized. Objects read from the stream are type checked as they are assigned.

Reading an object consists of the decoding of the object's class and the fields of each class starting with the highest superclass and ending with the actual class.

For an object to handle its own serialization it must implement the "readobject" method. To maintain the integrity of the class, this method is private to the class and can only be called by the serialization at runtime. This method is invoked when the fields of its class are to be read; it should read the information written by "writeObject" and make appropriate assignments to the object's fields. If the state of the object cannot be completely restored at the time the object is being read, a validation callback can be requested by calling the "registervalidation" method.

The default mechanism reads each non-static and non-transient field from the stream. Each field is read appropriately depending on its type. The fields are read in the same canonical order as when written so as to be insensitive to the order of declaration.

Objects of class "Class" are deserialized as the name of the class and fingerprint. A fingerprint is a hash of the interfaces, methods, and fields of the class. The "resolveClass" method is called to find the class by name and return its "Class" object. The hash is computed for the returned class and compared with the hash of the class serialized. Deserialization proceeds only if the class matches. This ensures that the structure of the stream matches the structure of the class. All other normal Java classes are deserialized by reading the encoding of its Class followed by its fields.

"ObjectInput" streams can be extended to utilize customized information in the stream about classes or to replace objects that have been deserialized. Refer to the "resolveclass" and "resolveobject" method descriptions in the Appendix for details.

Protecting Sensitive Information

When developing a class that provides controlled access to resources, care must be taken to protect sensitive information and functions. During deserialization (by default) the private state of the object is restored. For example, a file descriptor contains a handle that provides access to an operating system resource. Being able to forge a file descriptor would allow some forms of illegal access, since restoring state is done from a stream. Therefore, the serializing runtime must take the conservative approach and not trust the stream to contain only valid representations of objects. To avoid compromising a class, the sensitive state of an object must not be restored from the stream or it must be reverified by the class. Several techniques are available to protect sensitive data in classes.

The easiest technique is to mark fields that contain sensitive data as "private transient." Transient and static fields are not serialized or deserialized. Simply marking the field will prevent the state from appearing in the stream and from being restored during deserialization. Since writing and reading (of private fields) cannot be superseded outside of the class, the classes transient fields are safe.

Particularly sensitive classes should not be serialized at all. To accomplish this, "writeobject" and "readobject" methods should be implemented to throw the "NoAccessException." Throwing an exception aborts the entire serialization or deserialization process before any state from the class can be serialized or deserialized.

Some classes may find it beneficial to allow writing and reading but specifically handle and revalidate the state as it is deserialized. The class should implement "writeObject" and "readObject" methods to save and restore only the appropriate state. If access should be denied, throwing a "NoAccessException" will prevent further access.

Fingerprints of Classes

Within an object stream classes are represented by name and fingerprint. This fingerprint is used to verify that the class used to deserialize the object is the same as the class of the object serialized. The shallow signature or fingerprint of a class is computed by hashing the class name and access flags, the interfaces supported by the class, the field names, access flags and signatures, and the method names, access flags and signatures. Each set of interfaces, fields, and methods are put in a canonical order prior to hashing so that the order of declaration does not affect the hash. The shallow fingerprints of the class and all superclasses are rehashed to define the fingerprint of the class that is used in the stream.

The "FingerPrintClass" implementation also provides a total fingerprint that includes the fingerprints of each class referred to by the class as a parameter or return value. The values and strings included in the hash are those of the Java Virtual Machine Specification that define classes, methods, and fields.

Please refer to the attached Appendix for further details on serialization/deserialization of objects.

What is claimed is:

1. A method of operating a computer network comprising the steps of:

specifying a remote database and a database command within a firewall circumventing protocol message at a client;

sending said firewall circumventing protocol message from said client to a server, said remote database accessible to said server; and performing said database command at said server responsive to said firewall circumventing protocol message;

wherein said database command is a storage command or a retrieval command.

2. The method of claim 1 wherein said firewall circumventing protocol message is an HTTP message.

3. The method of claim 2 wherein said HTTP message is an HTTP POST message.

4. The method of claim 1 further comprising the step of encapsulating a data item to be stored in said remote database within said firewall circumventing protocol message.

5. The method of claim 4 wherein said data item is a Java object.

6. The method of claim 5 wherein said encapsulating step comprises serializing said Java object.

7. The method of claim 6 wherein said writing step comprises invoking Remote Method Interface.

8. The method of claim 2 wherein said remote database and said database command are specified in the form of a URL within said HTTP message.

9. The method as recited in claim 4 wherein said database command is selected from the group consisting of add, get, remove, and save.

10. A method of operating a client computer system in a computer network, comprising the steps of:

specifying a remote database accessible to a server and a database command within a firewall circumventing protocol message; and sending said firewall circumventing protocol message from said client computer system to said server via said network in a manner which causes said server to perform said specified database command;

wherein said database command is a storage command or a retrieval command.

11. A method of operating a server computer system in a computer network, said server computer system configured to receive protocol messages, comprising the steps of:

receiving a firewall circumventing protocol message from a client via said computer network, wherein said firewall circumventing protocol message comprises information specifying a database accessible to said server computer system and a database command; and thereafter performing at said server, responsive to receipt of said firewall circumventing protocol message, said database command on said database;

wherein said database command is a storage command or a retrieval command.

12. The method of claim 11 wherein said firewall circumventing protocol message is an HTTP message.

13. The method of claim 12 wherein said HTTP message is an HTTP POST message.

14. The method of claim 11 wherein said firewall circumventing protocol message comprises a data item to be stored on the remote database, and wherein said performing step comprises extracting said data item from said firewall circumventing protocol message.

15. The method of claim 14 wherein said data item comprises a JAVA object.

16. The method of claim 15 wherein said extracting step comprises reading said JAVA object from a data stream.

17. The method of claim 11 wherein said database command is selected from the group consisting of add, get, remove, and save.

18. A computer program product for use with a client computer system connected to a computer network, said product comprising:

code for specifying a remote database accessible to a server and a database command within a firewall circumventing protocol message;

code for sending said firewall circumventing protocol message from said client computer system to said server via said network in a manner which causes said server to perform said specified database command; and a computer-readable medium for storing the codes;

wherein said database command is a storage command or a retrieval command.

19. The product of claim 18 wherein said firewall circumventing protocol message is an HTTP message.

20. The product of claim 19 wherein said HTTP message is an HTTP POST message.

21. The product of claim 18 further comprising code for encapsulating a data item to be stored in said remote database within said firewall circumventing protocol message.

22. The product of claim 21 wherein said data item comprises a JAVA object.

23. The product of claim 22 wherein said encapsulating code comprises code for requesting writing of said JAVA object to a data stream.

24. The product of claim 23 wherein said code for requesting writing comprises code for invoking Remote Method Interface.

25. The product of claim 19 wherein said specifying code comprise code for specifying said remote database and said database command in the form of a URL within said HTTP message.

26. The product of claim 19 wherein said database command is selected from the group consisting of add, get, remove, and save.

27. A computer program product for operating a server computer system in a computer network, said product comprising:

code for receiving a firewall circumventing protocol message from a client via said computer network, wherein said firewall circumventing protocol message comprises information specifying a database accessible to said server computer system and a database command;

code for performing at said server, responsive to receipt of said firewall circumventing protocol message, said database command on said database; and a computer-readable medium for storing the codes;

wherein said database command is a storage command or a retrieval command.

28. The product of claim 27 wherein said firewall circumventing protocol message is an HTTP message.

29. The product of claim 28 wherein said HTTP message is an HTTP POST message.

30. The product of claim 27 wherein said firewall circumventing protocol message comprises a data item to be stored on the remote database, and wherein said performing, code comprises code for extracting said data item from said firewall circumventing protocol message.

31. The product of claim 30 wherein said data item comprises a JAVA object.

32. The product of claim 31 wherein said extracting code comprises code for reading said JAVA object from a data stream.

33. The product of claim 27 wherein said database command is selected from the group consisting of add, get, remove, and save.

34. A computer system configured to operate as a client system in a computer network and comprising:

a processor;

a computer-readable storage medium storing software for execution by said processor, said software comprising:

code for specifying a remote database accessible to a server and a database command within a firewall circumventing protocol message; and code for sending said firewall circumventing protocol message from said client computer system to said server via said network in a manner which causes said server to perform said specified database commands;

wherein said database command is a storage command or a retrieval command.

35. The computer system of claim 34 wherein said firewall circumventing protocol message comprises an HTTP message.

36. A computer system configured to operate as a server system in a computer network and comprising:

a processor;

a computer-readable storage medium storing software for execution by said processor, said software comprising:

code for receiving a firewall circumventing protocol message from a client via said computer network, wherein said firewall circumventing protocol message comprises information specifying a database accessible to said server computer system and a database command; and code for performing at said server, responsive to receipt of said firewall circumventing protocol message, said database command on said database;

wherein said database command is a storage command or a retrieval command.

37. The computer system of claim 36 wherein said firewall circumventing protocol message comprises an HTTP message.

* * * * *

UNITED STATES PATENT AND TRADEMARK OFFICE
CERTIFICATE OF CORRECTION

PATENT NO. : 5,944,781
DATED : August 31, 1999
INVENTOR(S) : Freeman C. Murray

It is certified that error appears in the above-identified patent and that said Letters Patent is hereby corrected as shown below:

In column 9, line 5, replace "claim 1" with --claim 10--.
In column 9, line 10, replace "claim 1" with --claim 10--.

Signed and Sealed this

Thirtieth Day of January, 2001

Attest:

Q. TODD DICKINSON

*Attesting Officer*   *Director of Patents and Trademarks*